United States Patent
Shevchenko et al.

(10) Patent No.: US 8,992,688 B2
(45) Date of Patent: Mar. 31, 2015

(54) LIGNIN SEPARATION FROM LIGNOCELLULOSIC HYDROLIZATES AND ACIDIFIED PULP MILL LIQUORS

(71) Applicant: Ecolab USA Inc., Naperville, IL (US)

(72) Inventors: Sergey M. Shevchenko, Aurora, IL (US); Jane B. Wong Shing, Aurora, IL (US); Olivier Clot, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 13/792,099

(22) Filed: Mar. 10, 2013

(65) Prior Publication Data

US 2014/0251318 A1    Sep. 11, 2014

(51) Int. Cl.
*C08B 1/00*    (2006.01)

(52) U.S. Cl.
CPC ..................................... *C08B 1/003* (2013.01)
USPC .......................................................... 127/34

(58) Field of Classification Search
None
See application file for complete search history.

(56) References Cited

U.S. PATENT DOCUMENTS

| | | | | |
|---|---|---|---|---|
| 5,178,770 | A | * | 1/1993 | Chung .......................... 210/705 |
| 5,338,816 | A | * | 8/1994 | Ramesh et al. ............... 526/312 |
| 5,435,922 | A | * | 7/1995 | Ramesh et al. ............... 210/734 |
| 6,258,279 | B1 | * | 7/2001 | Shah et al. .................... 210/734 |
| 2007/0259412 | A1 | * | 11/2007 | Belanger et al. .............. 435/161 |
| 2012/0196233 | A1 | * | 8/2012 | Ni et al. ........................... 431/2 |

* cited by examiner

*Primary Examiner* — Melvin C Mayes
*Assistant Examiner* — Douglas Call
(74) *Attorney, Agent, or Firm* — Benjamin E. Carlsen

(57) ABSTRACT

The invention provides methods and compositions for the removal of lignin from water suspensions originating from lignocellulosic feedstocks. The method involves adding coagulants and flocculants to the suspension. While hydrolysis does remove some lignin, the pitch in many feedstocks prevents the hydrolysis from coming into contact with all of the lignin or so effectively blocks it that the lignin can re-condense. This is especially the case with low lignin grass based lignocellulosic feedstock. But with the addition of the inventive coagulants and flocculants, a phase separation substantially accelerates and lignin forms flocs that forms that physically separates the lignin from the pitch and the cellulose thereby makes removal the lignin from aqueous suspensions by decanting and filtration effective and easy.

8 Claims, No Drawings

US 8,992,688 B2

LIGNIN SEPARATION FROM LIGNOCELLULOSIC HYDROLIZATES AND ACIDIFIED PULP MILL LIQUORS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to the area of making chemical products from renewable materials. Specifically, the invention relates to compositions, methods, and apparati for improving the removal of lignin from its aqueous suspensions. As described, for example, in U.S. Pat. No. 8,030,039, lignocellulosic materials (i.e. plant matter) can be processed to obtain a number of useful items such as cellulose, paper, pulp, plastics, alcohols, organic compounds, combustible fuels, and sugars. To obtain the various end products, however, a number of separation and processing steps must be performed. One of the most crucial steps is the separation of solid dispersed lignin from a liquid phase.

Lignin is a highly complex polyphenolic compound, which is an integral part of the secondary cell walls of plants. It is one of the most abundant organic polymers on Earth and typically constitutes between a quarter and a third of the dry mass of wood. In plants, lignin provides structural support by forming covalent bonds that cross-link with cellulose and hemicellulose in plant xylem cells.

The specific chemical nature of lignin prevents it from depolymerization in common plant biomass processing technologies that involve carbohydrate depolymerization and dissolution. Its subsequent removal as a solid phase then is required because the presence of lignin is known to impair many water based processing steps such as fermentation. Also lignin contains numerous carbonyl and aromatic groups which are highly reactive and interfere with numerous chemical processing steps. As a result, most techniques for processing lignocellulosic materials attempt to remove lignin quite early in the process. For example US Published Patent Application 2007/0259412 describes the production of ethanol biofuel from lignocellulosic materials which involves separating lignin from cellulose and then converting the cellulose into biofuel. Other examples are U.S. Pat. Nos. 296,935 and 8,366,877 which describes methods of removing lignin from wood pulp before producing paper. In addition, lignin is also removed because it has been found to be useful for various purposes for example as a dispersant, a flocculant, a tanning agent, and to be burned as an energy source. Efficient lignin removal is essential for the economic viability of plant biomass processing.

Some examples of biomass processing involving lignin removal are described in U.S. Pat. No. 8,043,839, European Patent Publication EP2336193, and Scientific Papers: *Hydrolysis if Lignocellulosic Materials for Ethanol Production: a Review*, by Y Sun et al., Bioresource Technology vol. 83, pp. 1-11, (2002), and *Pretreatment of Corn Stover by Aqueous Ammonia*, by T Kim et al., Bioresource Technology vol. 90, pp. 39-47, (2003) and U.S. Pat. No. 8,043,839. Such methods include hydrolysis, e.g., acid hydrolysis, autohydrolysis, steam explosion, ammonia fiber explosion, ozonolysis, acid hydrolysis, alkaline hydrolysis, oxidative delignification, biological/enzymatic delignification, as well as degrading by other methods of the cellulose or hemicelluloses from the lignin. Unfortunately, because of how deep within the cell wall the lignin resides, as well as lignin's innate stiffness, and tendency to recondensate during delignification, all existing bioprocessing methods have difficulty with fast lignin removal from the aqueous phase due to its finely dispersed nature and difficulty to coagulate and settle down; for the same reason filtering dispersed lignin out is always a cumbersome and lengthy process. This stage makes processing lignocellulosic materials longer and less economically attractive. As a result there is clear utility in novel methods, compositions, and apparati for improved removal of lignin from process solutions in technologies involving lignocellulosic materials.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed towards a method of removing dispersed lignin from a suspension in water such as feedstock for cellulosic ethanol or acidified black liquor from wood pulping. The method comprises the steps of: initiating the water-based material containing lignin suspension at the pH lower the one required for lignin to be present in a dissolved farm (approx. pH9.5 and lower), and adding sufficient coagulant to the lignin suspension in water to effect a fast phase separation between the lignin and the water phase, wherein in the absence of the coagulant, separated lignin would otherwise have remained in the water phase as a suspension with a long separation time.

The method may further comprise adding a flocculant to the feedstock. The coagulant may be one selected from the list consisting of Dimethylamine-epichlorohydrine copolymer, Poly(diallyldimethylammonium chloride), aluminum sulfate, and any combination thereof. The flocculant may be DMAEA.MCQ, DMAEA.BCQ and any combination thereof. The feedstock may be a grass based material and therefore has a low lignin content which is harder to dissociate from cellulose fibers than lignin in wood based feedstock and which cannot be dissociated with basic based hydrolysis. The amount of acid used in the hydrolysis might not substantially remove lignin but for the presence of the coagulant. Substantially more than 80% of the dispersed lignin may be separated from carbohydrate hydrolizates within 5 minutes of adding the coagulant to the feedstock.

Additional features and advantages are described herein, and will be apparent from, the following Detailed Description.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Consisting Essentially of" at means that the methods and compositions may include additional steps, components, ingredients or the like, but only if the additional steps, components and/or ingredients do not materially alter the basic and novel characteristics of the claimed methods and compositions.

"DMAEA.MCQ" means acrylamide-dimethylaminoethylacrylate methyl chloride quaternary salt.

"DMAEA.BCQ" means acrylamide-dimethylaminoethylacrylate benzyl chloride quaternary.

"Natural Gum" means a polysaccharide characterized as being originally of natural origin and which when placed in a solution imposes a large viscosity increase in said solution even when in a small concentration, natural gum includes a number of plant resins and includes but is not limited to seaweed polyelectrolytes such as agar, alginic acid, sodium alginate, carrageenan, botanical polyelectrolytes such as gum arabic from acacia tree sap, gum ghatti from anogeissus tree sap, gum tragacanth from astragalus shrub sap, karaya gum from anogeissus tree sap, gum tragacanth from astragalus shrub sap, kararya gum from sterculia tree sap, uncharged botanicals such as guar gum from guar beans, locust bean gum from carob tree seeds, beta-glucan from oat and barley bran, chicle gum from chicle trees, dammar gum from dipterocarpaceae tree sap, glucommannan from koniac plants, mastic gum from mastic trees, psyllium seed husks from plantago plants, spruce gum from spruce trees, tam gum from tara tree seeds, and bacterial fermentation products such as gellan gum and xantham gum, "natural gum" also includes natural gum derivatives.

"Natural Gum Derivative" means a natural gum polysaccharide which has undergone some measure of chemical substitution of one or more of the subgroups (e.g. carboxymethyl, hydroxypropyl) in one, some or all of the monomer units in the polysaccharide backbone, the substitute constituents typically comprise one or more of sulfate, carboxylic acid (found in carragenan, alginate, pectin), carboxylic ester, pyruvic acid (found in pectin, xanthan gum, zooglan, and methylan), carboxymethyl, hydroxypropyl, methyl, methylethyl, hydroxyethyl, hydroxyethylmethyl and the like.

"Polysaccharide" means a polymeric carbohydrate having a plurality of repeating units comprised of simple sugars, the C—O—C linkage formed between two such joined simple sugar units in a polysaccharide chain is called a glycosidic linkage, and continued condensation of monosaccharide units will result in polysaccharides, common polysaccharides are amylose and cellulose, both made up of glucose monomers, polysaccharides can have a straight chain or branched polymer backbone including one or more sugar monomers, common sugar monomers in polysaccharides include glucose, galactose, arabinose, mannose, fructose, rahmnose, and xylose.

"Surfactant" is a broad term which includes anionic, nonionic, cationic, and zwitterionic surfactants. Enabling descriptions of surfactants are stated in *Kirk-Othmer, Encyclopedia of Chemical Technology*, Third Edition, volume 8, pages 900-912, and in *McCutcheon's Enulsifers and Detergents*, both of which are incorporated herein by reference.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

At least one embodiment of the invention is directed towards a method for solid separation in technical aqueous suspensions containing lignin by treating said suspensions with one or more flocculants. In at least one embodiment the flocculant is preceded by one or more coagulants. The method improves lignin separation from an aqueous phase in an aqueous lignin suspension.

In at least one embodiment the coagulant is one or more of those described in U.S. Pat. No. 7,473,334. Coagulants may be inorganic or organic. Representative inorganic coagulants include alum, sodium aluminate, polyaluminum chlorides or PACs, sulfated polyaluminum chlorides, polyaluminum silica sulfate, ferric sulfate, ferric chloride, and the like and blends thereof.

Many water soluble organic coagulants are formed by condensation polymerization. Examples of polymers of this type include epichlorohydrin-dimethylamine, and epichlorohydrin-dimethylamine-ammonia polymers.

Additional coagulants include polymers of ethylene dichloride and ammonia, or ethylene dichloride and dimethylamine, with or without the addition of ammonia, condensation polymers of multifunctional amines such as diethylenetriamine, tetraethylenepentamine, hexamethylenediamine and the like with ethylenedichloride and polymers made by condensation reactions such as melamine formaldehyde resins.

Additional coagulants include cationically charged vinyl addition polymers such as polymers and copolymers of diallylditnethylammonium chloride, dimethylaminoethylmethacrylate, dimethylaminoethylmethacrylate methyl chloride quaternary salt, methacrylamidopropyltrimethylammonium chloride, (methacryloxyloxyethyl)trimethyl ammonium chloride, diallylmethyl(beta-propionamido)ammonium chloride, (beta-methacryloxyloxyethyl)trimethyl-ammonium methylsulfate, quatemized polyvinyllactam, dimethylamino-ethylacrylate and its quaternary ammonium salts, vinylamine and acrylamide or methacrylamide.

Preferred coagulants are poly(diallyldimethylammonium chloride), EPI/DMA, $NH_3$ crosslinked diallyl-N,N-disubstituted ammonium halide-acrylamide copolymers and polyaluminum chlorides.

In at least one embodiment the flocculants is one or more of those described in U.S. Pat. No. 7,473,334. Suitable flocculants generally have molecular weights in excess of 1,000,000 and often in excess of 5,000,000 Daltons and are anionic, nonionic, zwitterionic car amphoteric polymers. The polymeric flocculant is typically prepared by vinyl addition polymerization of one or more cationic, anionic or nonionic monomers, by copolymerization of one or more cationic monomers with one or more nonionic monomers, by copolymerization of one or more anionic monomers with one or more nonionic monomers, by copolymerization of one or more cationic monomers with one or more anionic monomers and optionally one or more nonionic monomers to produce an amphoteric polymer or by polymerization of one or more zwitterionic monomers and optionally one or more nonionic monomers to form a zwitterionic polymer. One or more zwitterionic monomers and optionally one or more nonionic monomers may also be copolymerized with one or more anionic or cationic monomers to impart cationic or anionic charge to the zwitterionic polymer.

While cationic polymer flocculants may be formed using cationic monomers, it is also possible to react certain nonionic vinyl addition polymers to produce cationically charged polymers. Polymers of this type include those prepared through the reaction of polyacrylamide with dimethylamine and formaldehyde to produce a Mannich derivative.

Similarly, while anionic polymer flocculants may be formed using anionic monomers, it is also possible to modify certain nonionic vinyl addition polymers to form anionically charged polymers. Polymers of this type include, for example, those prepared by the hydrolysis of polyacrylamide.

The flocculant may be used in the solid form, as an aqueous solution, as a water-in-oil emulsion, or as dispersion in water. Representative cationic polymers include copolymers and terpolymers of (meth)acrylamide with dimethylaminoethyl methacrylate (DMAEM), dimethylaminoethyl acrylate (DMAEA), diethylaminoethyl acrylate (DEAEA), diethylaminoethyl methacrylate (DEAEM) or their quaternary ammonium forms made with dimethyl sulfate, methyl chloride or benzyl chloride.

Preferred coagulants and flocculants are selected from the group consisting of inverse emulsion polymers, dispersion polymers, solution polymers and gel polymers. "Inverse emulsion polymer" means a water-in-oil polymer emulsion comprising a cationic, anionic, amphoteric, zwitterionic or nonionic polymer according to this invention in the aqueous phase, a hydrocarbon oil for the oil phase and a water-in-oil emulsifying agent. Inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and, generally, another surfactant. See U.S. Pat. No. 3,734,873, incorporated herein by reference. "Dispersion polymer" means a dispersion of fine particles of polymer in an aqueous salt solution, which is prepared by polymerizing monomers with stirring in an aqueous salt solution in which the resulting polymer is insoluble. See U.S. Pat. Nos. 5,708,071; 4,929, 655; 5,006,590; 5,597,859; 5,597,858 and European Patent nos. 657,478 and 630,909. In a typical procedure for preparing solution and gel polymers, an aqueous solution containing one or more water-soluble monomers and any additional polymerization additives such as chelants, pH buffers, and the like, is prepared. This mixture is charged to a reactor equipped with a mixer, a thermocouple, a nitrogen purging tube and a water condenser. The solution is mixed vigorously, heated to the desired temperature, and then one or more polymerization initiators are added. The solution is purged with nitrogen while maintaining temperature and mixing for several hours. Typically, the viscosity of the solution increases during this period. After the polymerization is complete, the reactor contents are cooled to room temperature and then transferred to storage. Solution and gel polymer viscosities vary widely, and are dependent upon the concentration and molecular weight of the active polymer component. The solution/gel polymer can be dried to give a powder.

Representative flocculants include but are not limited to one or more high molecular weight, water-soluble cationic, anionic, nonionic, zwitterionic, or amphoteric polymer flocculants alone or in combination with structurally modified diallyl-N,N-disubstituted ammonium halide polymers or dimethylmine-epichlorohydrin copolymers.

In addition all possible combinations of two or more of the above flocculants may be used. In addition all possible combinations of two or more of the above coagulants may be used.

The coagulant(s) and/or flocculant(s) polymer(s) can be applied individually or in a discrete sequence. Resultant from the addition of the polymers is a clarified process water stream and highly flocculated solids. In at least one embodiment the highly flocculated solids are handed by ordinary solid/liquid separation processes, such as filtration under pressure.

In at least one embodiment the suspension is a fluid medium containing the reaction products of lignocellulosic material undergoing hydrolysis reaction. The polymers are added after the hydrolysis reaction has completed.

Without being limited by a particular theory or design of the invention or of the scope afforded in construing the claims, it is believed that the presence of the polymers helps to undo the physical limitations that impair lignin separation. In acidic processes that transform carbohydrate components (cellulose and hemicelluloses) into water-soluble, fermentable low-molecular-weight sugars, and in acidified (pH<9.5) waters of alkaline processes that separate water-insoluble polymeric carbohydrate components (cellulose and hemicelluloses) from dissolved lignin, the later always, eventually, appear as a finely dispersed material that settles down very slowly and filters out with extreme difficulty. Lignin separation that is required for further processing of sugars in a fuel ethanol process and further processing of lignin as a commercial fuel in a traditional pulping process becomes a bottleneck in both applications. The invention uses specialty coagulants and flocculants to accelerate this process. Coagulants and flocculants employed in this invention are sometimes used in papermaking application to improve the formation of paper sheet that means they are applied on fiber originating from wood. It is obvious to anyone skilled in the art that the fiber is mostly hydrophilic, long cellulose fiber, and its properties are substantially different from the properties of finely dispersed (mostly, colloidal), hydrophobic, polyphenolic lignin. Application of such chemistries to lignin was not obvious. Moreover, it was not even expected that approaches practiced in papermaking would work in lignin/wood-to-ethanol processes due to both differences in the chemical and differences in the pH (the performance in such application is normally pH-dependent). As expected, most of the chemistries typically used in papermaking were not active in lignin processing. The invention identifies those few chemicals and their combinations that are indeed suitable for lignin applications. Application of the proposed polymers changes the behavior of lignin in the process media dramatically, causing fast coagulation and subsequent formation of flocs that can be easily separated from the solution by sedimentation and filtration, When the inventive polymers are added however, the polymers overcome the effects of the pitch and pull the lignin material into a distinct phase, away from the carbohydrates. As a result the lignin cannot re-condense because it is physically separated from the carbohydrates and the acid is far more effective than it would otherwise be.

In an ideal hydrolysis reaction of such material, sulfide free base severs linkages between the lignin and the carbohydrates (such as cellulose and hemicellulose) in the material and facilitates the degradation of the lignin leaving only cellulose and hemicellulose. In practice however sometimes pitch in the material impairs contact between base and the lignin and some of the lignin re-condenses with the carbohydrates. As a result when the carbohydrates are passed on to further processing stages (such as converting the carbohydrates into biofuels), the residual lignin may impede the process or degrades the quality of the end product.

In at least one embodiment the invention allows users to avoid the yield-quality tradeoff that plagues the prior art in the yield-quality tradeoff users need to choose between high product yields and high levels of delignification. Rates of hydrolysis delignification can be improved by increasing the intensity of the base (by raising the pH, increasing exposure time, and/or increasing temperature). More intense base however causes degradation of some of carbohydrates as well so a lower yield of carbohydrate derived end product will accompany a more effective delignification. In the inventive process however because greater delignification can occur without the need for intense bases, high delignification can coexist with high product yield.

In at least one embodiment the process is one which produces ethanol from the lignocellulosic material. In many ways delignification of ethanol producing stock is the opposite of delignification of paper pulp so one would not expect related method to have related degrees of success. Wood delignification to produce paper pulp uses feedstock that is very woody and has a high amount of lignin. Ethanol feedstock in contrast can be low lignin materials such as switchgrass or other grass or grass-like plant matter. In addition the reaction that converts the cellulose into ethanol is acid based not basic. As a result coagulants and flocculants that are known to work in basic environments would not be expected to function in acidic environments.

In at least one embodiment the flocculant added comprises DMAEA.MCQ-AcAm copolymer. Representative examples of DMAEA.MCQ are described in U.S. Pat. No. 8,247,597 Published Patent Application 2012/0061321 and International Patent Application WO/2011/023357.

In at least one embodiment the flocculant added comprises DMAEA.BCQ-AcAmcopolymer. Representative examples of DMAEA.BCQ are described in U.S. Pat. No. 5,643,460.

Examples

The foregoing may be better understood by reference to the following examples, which are presented for purposes of illustration and are not intended to limit the scope of the invention.

A lignin suspension produced from corncobs pretreated with dilute sulfuric acid. Ground corncobs were treated with 1% sulfuric acid (170° C., 15 min) under pressure. The pretreated slurry was extracted with an acetone/ethanol mixture (1/1 v/v) for 12 h. The organic solvent was filtered and removed. The resulting dry lignin was dissolved in a minimum amount of acetone and dispersed in water by ultrasonic mixing. In model experiments, the suspension was used either as is, diluted with water to form a 0.25% lignin slurry, or in combination with dissolved components simulating a hydrolyzate suspension (glucose, xylose, ammonium sulfate—see below).

Kraft lignin was precipitated from black liquor by passing $CO_2$ to pH 9.7 (STH-Packthrsk LignoBoost technology). No precipitation from dilute (0.25% solids) slurry was observed under any conditions, more concentrated material was too dark for preliminary testing. However, further acidification yielded lignin slurries that demonstrated properties similar to those of hydrolysis lignin.

In a typical jar test, 0.1% solutions were used to provide for the target concentration of the chemicals. The slurries were mixed at a high speed, 200 rpm, coagulant added when needed, mixing continued for 2.5 min, flocculant added, high speed mixing continued for 1 min, changed for slow mixing at 25 rpm for 2 min, then the mixture was allowed to settle for 5 min. The observation of qualitative test slurries (placed into test tubes after mixing) was continuous for 24 h. In quantitative tests, turbidity measurements were made immediately.

Chemicals Tested
Coagulants:
C-1—Dimethylamine-epichlorohydrin
C-2—Poly(diallyldimethylammonium chloride)
C3—Acrylamide-Diallyldimethylammonium chloride copolymer
C-4—Acrylamide-Diallyldimethylammonium chloride copolymer
C-5—Alum—50% aluminum sulfate
Flocculants:
F-1—Acrylamide-acrylic acid copolymer, sodium salt
F-2—Acrylamide-dimethylaminoethylacrylate methyl chloride quat. copolymer
F-3—Acrylamide-dimethylaminoethylacrylate methyl chloride quat. copolymer
F-4—Acrylamide-dimethylaminoethylacrylate methyl chloride quat. copolymer
F-5—Acrylamide-dimethylaminoethylacrylate benzyl chloride quat. copolymer
F-6—Acrylamide-dimethylaminoethylacrylate methyl chloride quat-dimethylaminoethylacrylate benzyl chloride quat. terpolymer
F-7—Acrylamide-dimethylaminoethylacrylate methyl chloride quat-dimethylaminoethylacrylate benzyl chloride quat. terpolymer
F-8—Acrylamide-dimethylaminoethylacrylate methyl chloride quat. copolymer In a series of 15 test tube experiments a variety of coagulant/flocculant combinations (0.25% slurries, 6-18 ppm doses, mixing and settling according to the standard flocculation protocol, additional filtering speed tests) were measured. The best options were further explored in standard quantitative turbidity tests in a medium that closely matches the anticipated plant conditions (pH adjustment, ammonium sulfate, lime, sugars in expected concentrations). The results demonstrated that the invention operates almost completely independent of the dissolved components of the slurry. The data are presented in the tables below.

Key:
0 No removal of lignin
— No removal of lignin and increased turbidity
~+ Marginal removal of lignin (about 5-10% of suspended lignin settled out after 5 minutes)
+ Significant removal of lignin (about 10-65% of suspended lignin settled out after 5 minutes)
++ Effective removal of lignin (about 65-100% of suspended lignin settled out after 5 minutes)

| # 1 | Kraft lignin, pH 2.3 | Observation |
|---|---|---|
| 1 | Blank | 0 |
| 2 | C-1 6 ppm | − |
| 3 | C-1 19 ppm | − |
| 4 | C-1/F-1 6/6 ppm | + |
| 5 | C-1/F-1 19/19 ppm | ++ |
| 6 | C-5 50% 6 ppm | 0 |

| # 2 | Kraft lignin, pH 2.3 | Observation |
|---|---|---|
| 1 | Blank | 0 |
| 2 | F-1 6 ppm | ~+ |
| 3 | F-1 19 ppm | + |
| 4 | F-3 19 ppm | ++ |
| 5 | F-2 19 ppm | ++ |
| 6 | F-4 19 ppm | ++ |

| #3 | Kraft lignin, pH 2.3 | Observation |
|---|---|---|
| 1 | Blank | 0 |
| 2 | C-1/F-1 6/6 ppm | ~+ |
| 3 | C-1/F-3 6/6 ppm | + |
| 4 | C-1/F-4 6/6 ppm | ++ |
| 5 | C-5 50%/F-1 6/6 ppm | ~+ |
| 6 | C-5 50%/F-3 6/6 ppm | + |

| #4 | Hydrolysis lignin, pH 3.5, water | Observation |
|---|---|---|
| 1 | Blank | 0 |
| 2 | C-1 19 ppm | ~+ |
| 3 | F-1 19 ppm | − |
| 4 | F-3 19 ppm | + |
| 5 | F-2 19 ppm | ++ |
| 6 | F-4 19 ppm | + |

| #5 | Hydrolysis lignin, pH 3.5, water | Observation |
|---|---|---|
| 1 | Blank | 0 |
| 2 | F-5 19 ppm | + |
| 3 | F-6 19 ppm | ~+ |
| 4 | F-7 19 ppm | − |
| 5 | F-8 19 ppm | ++ |
| 6 | C-3 19 ppm | + |

| #6 | Hydrolysis lignin, pH 3.5, water | Observation |
|---|---|---|
| 1 | Blank | 0 |
| 2 | C-4 19 ppm | + |
| 3 | F-8 19 ppm | ++ |
| 4 | C-1/C-4 19/19 ppm | ~+ |
| 5 | C-1/F-8 19/19 ppm | − |
| 6 | C-1/F-8 6/6 ppm | + |

| #7 | Hydrolysis-lignin, pH 6.4, water | Observation |
|---|---|---|
| 1 | Blank | 0 |
| 2 | F-8 6 ppm | 0 |
| 3 | C-1/F-8 6/6 ppm | + |
| 4 | C-5 50% 6 ppm | 0 |
| 5 | C-1/F-8 19/6 ppm | ++ |
| 6 | C-5 50%/F-8 19/6 ppm | ~+ |

| #8 | Hydrolysis lignin, pH 5.7, water | Observation |
|---|---|---|
| 1 | Blank | 0 |
| 2 | C-1/F-8 6/6 ppm | + |
| 3 | C-1/F-8 19/6 ppm | ++ |
| 4 | C-1/F-8 6/19 ppm | ++ |
| 5 | C-1/F-8 19/6 ppm | ++ |
| 6 | C-1/C-4 19/6 ppm | + |

| #9 | Hydrolysis lignin, pH 5.7, water | Observation |
|---|---|---|
| 1 | Blank | 0 |
| 2 | C-1 19 ppm | ++ |
| 3 | F-2 19 ppm | + |
| 4 | F-8 19 ppm | ++ |
| 5 | C-1 6 ppm | ~+ |
| 6 | F-8 6 ppm | 0 |

| #10 | Hydrolysis lignin, pH 6.4, water | Observation |
|---|---|---|
| 1 | Blank | 0 |
| 2 | C-1 12 ppm | ~+ |
| 3 | F-2 12 ppm | + |
| 4 | F-8 12 ppm | ~+ |
| 5 | C-1/F-2 6/6 ppm | ++ |
| 6 | C-1/F-8 6/6 ppm | + |

| #11 | Hydrolysis lignin, pH 5.7, water | Observation |
|---|---|---|
| 1 | Blank | 0 |
| 2 | C-1/F-5 6/6 ppm | ~+ |
| 3 | C-1/F-6 6/6 ppm | ~+ |
| 4 | C-1/F-7 6/6 ppm | ~+ |
| 5 | C-1/C-3 6/6 ppm | ~+ |
| 6 | C-1/C-4 6/6 ppm | ~+ |

| #12 | Hydrolysis lignin, pH 5.5, 10% glucose, 5% Xylose, 1.35% ammonium sulfate, pH finally adjusted with sodium hydroxide | Observation |
|---|---|---|
| 1 | Blank | 0 |
| 2 | C-1 12 ppm | 0 |
| 3 | C-1/F-2 6/6 ppm | ++ |
| 4 | C-1/F-8 6/6 ppm | + |
| 5 | C-1/F-5 6/6 ppm | 0 |
| 6 | C-1/C-3 6/6 ppm | 0 |

Turbidity data on acid hydrolysis corncob lignin,

| #1 | | Av.NTU |
|---|---|---|
| 1 | Blank | 3076 |
| 2 | C-1/F-8 4/4 ppm | 210 |
| 3 | C-1/F-2 4/4 ppm | 46 |
| 4 | C-1/F-2 8/4 ppm | 59 |
| 5 | C-1/F-2 4/8 ppm | 124 |
| 6 | C-1 8 ppm | 2177 |

| #2 | | |
|---|---|---|
| 1 | Blank | 2995 |
| 2 | F-2 4 ppm | 13 |
| 3 | F-8 8 ppm | 38 |
| 4 | C-2 8 ppm | 2878 |
| 5 | C-1/F-8 4/8 ppm | 111 |
| 6 | C-2/F-2 4/4 ppm | 16 |

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein, which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of removing lignin, the method comprising the steps of:
    acidifying a plant matter derived water-based lignin bearing suspension to a pH lower than the minimum pH required to dissolve lignin, said pH being no higher than 9.5, and
    adding coagulant to the lignin bearing suspension to effect a phase separation between a lignin bearing phase and an aqueous phase said phase separation characterized as separating at least 80% of the lignin from the aqueous phase within 5 minutes of the acidification,
    wherein in the absence of the coagulant, separated lignin would otherwise have remained in the aqueous phase as a suspension for more than 5 minutes and
    wherein the suspension before acidification contains at least 10% of the lignin originally present in the plant matter the suspension was derived from.

2. The method of claim 1 further comprising adding a flocculant to the suspension.

3. The method of claim 1 in which the coagulant is one selected from the group consisting of Dimethylamine-epichlorohydrine copolymer, Poly(diallyldimethylammonium chloride), aluminum sulfate, and any combination thereof.

4. The method of claim 2 in which the flocculant is DMAEA.MCQ, DMAEA.BCQ and any combination thereof.

5. The method of claim 1 in which the suspension consists of water and plant matter.

6. The method of claim 1 in which the suspension comprises a grass based material and therefore has a low lignin content which is harder to dissociate from cellulose fibers than lignin in wood based feedstock and which cannot be dissociated with basic based hydrolysis.

7. The method of claim 1 in which the amount of acid used in the hydrolysis would not have separated the lignin from the aqueous phase but for the presence of the coagulant.

8. The method of claim 1 in which the suspension comprises corncobs and therefore has a low lignin content which is harder to dissociate from cellulose fibers than lignin in wood based feedstock and which cannot be dissociated with basic based hydrolysis.

* * * * *